United States Patent [19]

Suzuki

[11] Patent Number: 5,760,338
[45] Date of Patent: Jun. 2, 1998

[54] WIRING HARNESS CLAMP

[75] Inventor: Takashi Suzuki, Yokkaichi, Japan

[73] Assignee: Sumitomo Wiring Systems, Ltd., Japan

[21] Appl. No.: 298,952

[22] Filed: Sep. 1, 1994

[30] Foreign Application Priority Data

Sep. 1, 1993 [JP] Japan ................. 5-052567 U

[51] Int. Cl.⁶ ................................. H02G 3/26
[52] U.S. Cl. ............... 174/72 A; 174/135; 248/73; 248/664; 411/433
[58] Field of Search ................. 174/72 A, 135; 248/73, 74.2, 74.4; 411/83, 182, 324, 427, 928, 433, 265, 267; 24/664, 665

[56] References Cited

U.S. PATENT DOCUMENTS

| | | | |
|---|---|---|---|
| 4,550,891 | 11/1985 | Schäty | 248/74.2 X |
| 4,570,303 | 2/1986 | Richmond et al. | 411/83 X |
| 4,990,044 | 2/1991 | Kimak | 411/427 |
| 5,131,613 | 7/1992 | Kamiya et al. | 248/74.3 |

FOREIGN PATENT DOCUMENTS

| | | |
|---|---|---|
| 2-96095 | 7/1990 | Japan. |
| 1514484 | 6/1978 | United Kingdom. |
| 2173250 | 10/1986 | United Kingdom. |

*Primary Examiner*—Hyung S. Sough
*Attorney, Agent, or Firm*—Banner & Witcoff, Ltd.

[57] ABSTRACT

A wiring harness clamp for attachment to a stud or bolt (5) has a base plate (4) for attachment to a wiring harness (1) and a holding portion (3) having opposite resilient arms (7a,7b). The facing portions of the arms have teeth (8) for engagement with a thread (11) of a stud or bolt (5). The arms (7a,7b) extend outwardly from the holding portion (3) and are movable away from one another generally parallel to the axis of the harness to release the stud or bolt.

15 Claims, 1 Drawing Sheet

WIRING HARNESS CLAMP

FIELD OF THE INVENTION

The present invention relates to a wiring harness clamp for attachment to a stud or a bolt, and particularly to a removable and reusable clamp. The clamp is fixed to the exterior of a wiring harness, and used to retain the wiring harness by gripping a projecting stud or bolt of a vehicle, machine or the like.

BACKGROUND AND SUMMARY OF THE INVENTION

A wiring harness clamp usually has a strip or belt-like base plate fixed to the exterior of a wiring harness using the wiring harness tape winding or a wound adhesive tape. A projecting stud or bolt is inserted into the clamp to retain the wiring harness on the body of a vehicle or the like. Japanese laid open utility model H2-96095 discloses a known example of a clamp which can be released from a stud or bolt and re-used.

This known example has a construction whereby a nut-shaped holding portion engageable with a stud or bolt of the vehicle is provided with a base plate secured to the holding portion by breakable fingers; the base plate is secured in use to the wiring harness. The holding portion can be forcefully turned with a tool and the breakable fingers broken, thereby separating the holding portion from the base plate on the wiring harness, and permitting the wiring harness to be released. The device can be reused, employing the now separate holding portion and base plate.

The known example described above has practical disadvantages in that the releasing operation is extremely troublesome and laborious since releasing the grip on the stud or bolt of the vehicle requires a procedure in which the breakable portion is broken using a tool to forcefully turn the nut-shaped holding portion, and subsequently the holding portion is removed from the stud or bolt by being unscrewed. Moreover, when the device is to be reused, it has a two-part structure with separate base plate and holding part, so that attention may need to be paid to the storage of the parts, and there is a risk that one of the separated parts may be lost and the initial integrated capabilities thus lost.

There is a requirement for the reuse of parts in wiring harness systems including wiring harness clamps, and an improvement is sought whereby parts can be reused while maintaining their normal capabilities and original structure. The present device provides a wiring harness clamp for a stud or bolt, which eliminates the disadvantages of the prior art mentioned above and meets the technical requirements in the relevant field.

According to the invention there is provided a wiring harness clamp for attachment to a stud or bolt characterized in that a base portion adapted for fixing to a wiring harness is integrally provided with a bolt holding portion which in use receives and holds a stud or bolt; the said bolt holding portion extending in the direction in which the said stud or bolt is inserted in use and comprising a pair of opposite resilient holding parts having holding teeth for engagement with teeth of a stud or bolt, the resilient holding parts having free ends formed as release members movable resiliently in the length direction of a wiring harness to which the said base portion is fixed in use.

Preferably the holding parts extend outwardly from said bolt holding portion and away from said base portion. The free ends of the holding parts may extend outwardly from said bolt holding portion and away from one another in a direction parallel to the intended axis of said harness. The holding parts may be substantially perpendicular to the intended axis of the harness.

In a preferred embodiment, the main clamp portion comprises a substantially rectangular block having an aperture therein to receive said stud or bolt, the holding parts being substantially contiguous with said block.

The holding teeth may form a helical thread. Preferably, the teeth are adapted to allow easier attachment of the bolt holding portion to the stud or bolt than detachment thereof. The teeth may be of a saw tooth design.

In one embodiment of the invention, the base portion includes adhesive tape, a wiring harness being secured to the clamp by winding said adhesive tape around said harness.

The teeth of the bolt holding portion are preferably the same profile as the teeth of the stud or bolt and may mate exactly therewith.

BRIEF DESCRIPTION OF THE DRAWINGS

Other features of the invention will be apparent from the following description of a preferred embodiment, shown by way of example only in the accompanying drawings in which.

DETAILED DESCRIPTION OF THE PREFERRED EMBODIMENT

Figure 1:
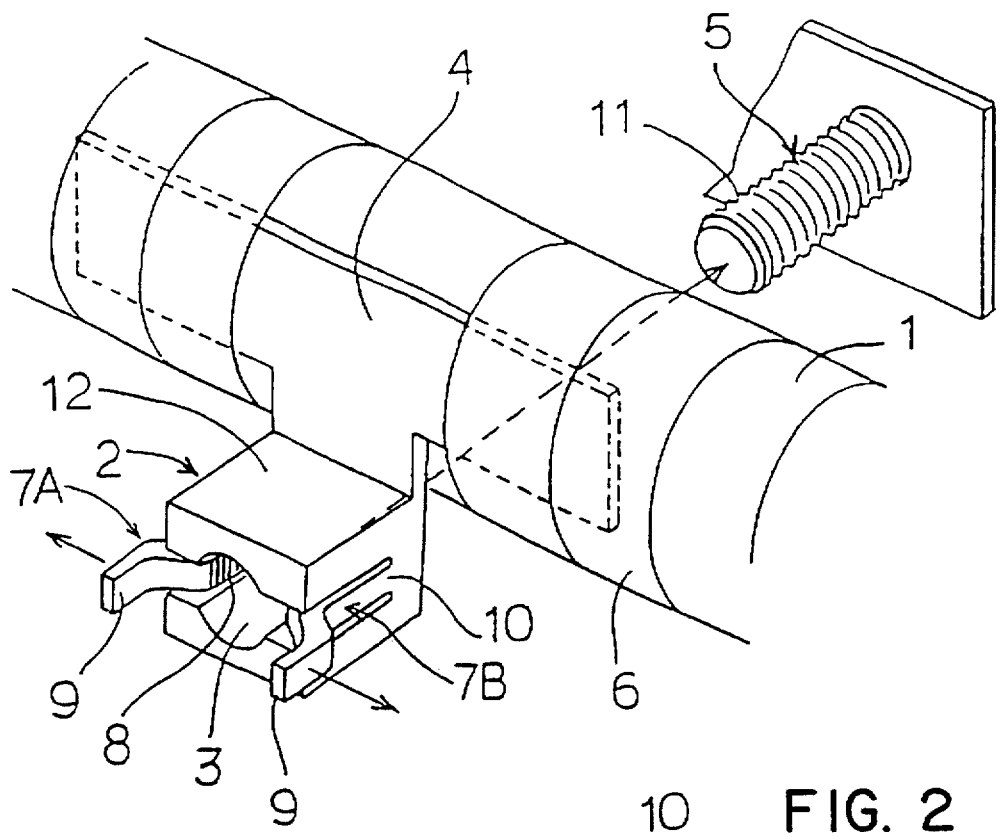
FIG. 1 is an exploded asymmetric view illustrating stud-bolt clamp of the present invention.

With reference to the drawings FIG. 1 illustrates use of the wiring harness clamp of the present invention to secure a wiring harness of an automobile. The wiring harness clamp comprises a main clamp portion 2 having a base plate 4 integrally formed at one side thereof; the base plate 4 is secured to the outside of a wiring harness 1 by means of tape windings 6. The main clamp portion 2 is provided with a bolt or stud holding portion 3 which is described in greater detail below. A stud or bolt 5 projecting from the vehicle structure is engageable in the bolt holding portion 3 to secure the main clamp portion, and thus the wiring harness, to the vehicle.

The main clamp portion 2 comprises a hollow generally rectangular frame 12; the portions to the left and right of the frame 12 (as viewed) comprise opposite resilient holding members 7a and 7b extending in a direction parallel to the axis of the aperture of the bolt holding portion 3 as illustrated. The resilient members 7a and 7b are substantially identical.

Figure 3:
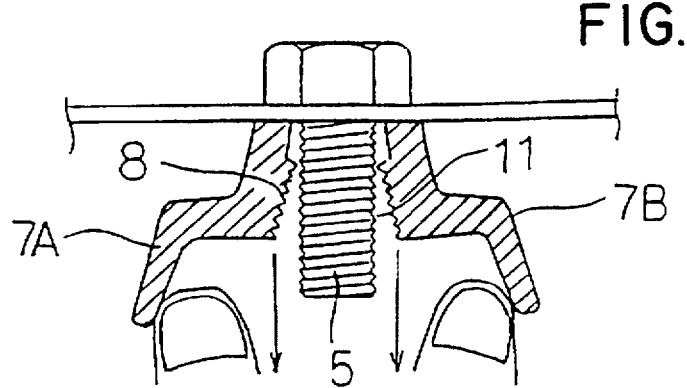
FIG. 3 is a view similar to FIG. B showing the stud-bolt clamp in the disengaged condition.

The resilient members 7a and 7b are formed on their facing surfaces with teeth 8 adapted to engage a thread 11 of the stud or bolt 5. The free ends of the resilient holding part 7a and 7b extend away from the wiring loom as illustrated and project from the front of the frame 12; the free ends also extend away from one another. The resilient members can thus be easily forced apart by finger tips or the like, as illustrated in FIG. 3.

The members 7a and 7b are adapted for movement toward and away from one another in a direction generally parallel to the axis of the wiring harness when mounted on the base plate 4, as illustrated in FIG. 1.

Figure 2:
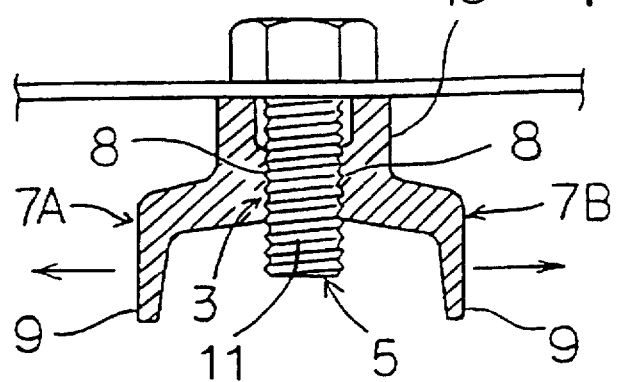
FIG. 2 is a transverse sectional view through the stud-bolt clamp in the engaged condition.

In operation the clamp can be engaged with a projecting stud or bolt by urging the resilient holding members 7a and 7b apart as the bolt or stud is inserted into the holding portion 3; the release parts 9 of the resilient members 7a and 7b can be held apart with finger tips or by a suitable tool. When the release parts 9 are released, they move inwardly under the resilient return force, and the teeth 8 engage the threaded portion of the stud or bolt to securely hold the wiring harness to the vehicle structure. FIG. 2 illustrates the engaged condition of the stud-bolt clamp.

When it is desired to release the stud-bolt clamp from the vehicle structure, the release parts 9 are moved apart, using finger tips or a suitable tool, to disengage the teeth 8 from the stud or bolt 5. The disengaged condition of the clamp is illustrated in FIG. 3. The clamp may then be removed from the stud or bolt.

A clamp having disengageable resilient members 7a and 7b can thus be used repeatedly while retaining its initial capabilities and without losing or damaging any structural components whatsoever.

It is an important feature of the present invention that the direction of movement of the members 7a and 7b is along the axis of the wiring harness where free access for movement of the holding parts is most likely to be found.

Other embodiments of the stud-bolt clamp are possible. The frame 12 may be substantially omitted leaving the resilient holding parts 7a and 7b projecting from a clamp base portion. In yet another embodiment the frame 12 may have a more simple form. The teeth 8 may be adapted to permit push engagement of the clamp, the teeth of the clamp and stud or bolt ratcheting over one another. The teeth may be of a saw tooth profile to permit easier engagement than disengagement.

I claim:

1. A wiring harness clamp for attachment to a stud or bolt comprising a base portion adapted to be fixed to a wiring harness and a bolt holding portion integrally formed with and fixed to said base portion for receiving and holding a stud or bolt which extends in a first direction, said bolt holding portion including a body having an opening offset from said base portion and extending in the first direction to receive said stud or bolt in use, said opening being defined by a pair of opposite resilient elongate arms, each arm having opposite first and second ends and being connected to said body for arcuate movement about said first end, each arm further having an inner portion adjacent said first end with holding teeth for engagement with threads of the stud or bolt and an outer portion with a release member at said second end such that said inner portion is axially positioned in said first direction between said release member and said connection of said first end to said body, said release members being resiliently movable in a second direction generally transverse to said first direction to thereby spread said arms in an arcuate motion about said first end such that said teeth release the threads of said stud or bolt and said wiring harness clamp is secured to and released from said stud or bolt without rotation.

2. A clamp according to claim 1 wherein said arms extend outwardly and away from said base portion.

3. A clamp according to claim 1 wherein said arms are substantially perpendicular to an axis of the wiring harness in use.

4. A clamp according to claim 1 wherein the holding teeth form portions of a helical thread.

5. A clamp according to claim 1 wherein the holding teeth are disposed to allow easier attachment of the clamp to the stud or bolt than detachment thereof.

6. A clamp according to claim 5 wherein the holding teeth are of a saw tooth profile.

7. A clamp according to claim 1 wherein the base portion includes a base plate and adhesive tape for securing said base plate to the wiring harness by winding said adhesive tape around said harness and said base plate.

8. A wiring harness clamp for attachment to a stud or bolt comprising a base portion adapted to be fixed to a wiring harness and a bolt holding portion integrally formed with and fixed to said base portion for receiving and holding a stud or bolt which extends in a first direction, said bolt holding portion including an opening offset from said base portion and extending in the first direction to receive said stud or bolt in use, said opening being defined by a pair of opposite resilient arms, each arm having an inner portion with holding teeth for engagement with threads of the stud or bolt and an outer portion with a release member at a free end thereof, said release members being resiliently movable in a second direction generally transverse to said first direction to thereby spread said arms such that said teeth release the threads of said stud or bolt and said wiring harness clamp is secured to and released from said stud or bolt without rotation, said free ends being spaced radially outwardly from said teeth to provide space for manual grasping and spreading of said release members.

9. A wiring harness clamp for attachment to a stud or bolt comprising a base portion adapted to be fixed to a wiring harness and a bolt holding portion integrally formed with and fixed to said base portion for receiving and holding a stud or bolt which extends in a first direction, said bolt holding portion including an opening offset from said base portion and extending in the first direction to receive said stud or bolt in use, said opening being defined by a pair of opposite resilient arms, each arm having an inner portion with holding teeth for engagement with threads of the stud or bolt and an outer portion with a release member said release members being resiliently movable in a second direction generally transverse to said first direction to thereby spread said arms such that said teeth release the threads of said stud or bolt and said wiring harness clamp is secured to and released from said stud or bolt without rotation, said bolt holding portion including a substantially rectangular block having an aperture aligned with said opening defined by said arms for receiving said stud or bolt, said arms on their proximal ends being contiguous with said block.

10. A wiring harness assembly having a wiring harness and a clamp for attachment to a stud or bolt, the clamp comprising a base portion fixed to said wiring harness and a bolt holding portion integrally formed with and fixed to said base portion for receiving and holding a stud or bolt that extends in a first direction, said bolt holding portion including an opening offset from said base portion and extending in the first direction to receive said stud or bolt in use, said opening being defined by a pair of opposite resilient arms extending substantially parallel to said opening, each arm having an inner portion with holding teeth for engagement with threads of the stud or bolt and an outer portion with a release member, said release members being resiliently movable in a second direction generally transverse to said first direction to thereby spread said arms such that said teeth release the threads of said stud or bolt and said wiring harness clamp is secured to and released from said stud or bolt without rotation.

11. An assembly according to claim 10 wherein said arms include free ends which are spaced radially outwardly from said teeth to provide space for manual grasping and spreading of said release members away from one another in a direction parallel to an axis of said wiring harness.

12. An assembly according to claim 10 wherein said arms are substantially perpendicular to an axis of said wiring harness.

13. An assembly according to claim 10 wherein said base portion is secured to said wiring harness by adhesive tape.

14. In a chassis having a mounting stud or bolt, a wiring harness assembly includes a wiring harness having a clamp fixed thereto, said clamp being for attachment to said stud or bolt, wherein said clamp comprises a base portion secured to said wiring harness and a bolt holding portion integrally formed with and fixed to said base portion to which receive and hold said stud or bolt which extends in a first direction, said bolt holding portion including an opening offset from said base portion and extending in the first direction to receive said stud or bolt, said opening being defined by a pair of opposite resilient arms extending substantially parallel to said opening, each arm having an inner portion with holding teeth to engage threads of said stud or bolt, each resilient arm having a free end extending axially and radially outward of said teeth, said free ends being formed as release members which are resiliently movable in a second direction generally transverse to said first direction to thereby spread said arms such that said teeth release the threads of said stud or bolt and said wiring harness clamp is secured to and released from said stud or bolt without rotation.

15. A chassis according to claim 14 wherein the threads of said stud or bolt have the same profile as the holding teeth of said clamp.

* * * * *